United States Patent
Shih et al.

(10) Patent No.: US 12,369,098 B2
(45) Date of Patent: Jul. 22, 2025

(54) METHOD AND APPARATUS OF UPDATING ROUTING TABLE OF AN IAB (INTEGRATED ACCESS BACKHAUL) NODE IN A WIRELESS COMMUNICATION SYSTEM

(71) Applicant: ASUSTek Computer Inc., Taipei (TW)

(72) Inventors: Tun-Huai Shih, Taipei (TW);
Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 71 days.

(21) Appl. No.: 17/324,074

(22) Filed: May 18, 2021

(65) Prior Publication Data

US 2021/0274425 A1 Sep. 2, 2021

Related U.S. Application Data

(63) Continuation of application No. 16/502,992, filed on Jul. 3, 2019, now abandoned.

(60) Provisional application No. 62/712,577, filed on Jul. 31, 2018.

(51) Int. Cl.
*H04W 40/24* (2009.01)
*H04L 41/12* (2022.01)
*H04L 45/28* (2022.01)
*H04L 45/48* (2022.01)

(52) U.S. Cl.
CPC .......... *H04W 40/248* (2013.01); *H04L 41/12* (2013.01); *H04L 45/28* (2013.01); *H04L 45/48* (2013.01)

(58) Field of Classification Search
CPC ....... H04L 45/28; H04L 45/48; H04L 45/484; H04L 45/488; H04L 41/12; H04W 40/248; H04W 40/02; H04W 40/18; H04W 40/22; H04W 84/04; H04B 7/0413
See application file for complete search history.

(56) References Cited

U.S. PATENT DOCUMENTS

| | | | | |
|---|---|---|---|---|
| 5,608,649 | A * | 3/1997 | Gopinath | H04Q 3/002 709/252 |
| 7,653,730 | B1 * | 1/2010 | Hoffman | H04L 43/0852 709/227 |
| 8,693,375 | B2 * | 4/2014 | Reichstein | H04L 45/18 370/408 |
| 10,015,075 | B1 * | 7/2018 | Yang | H04L 45/48 |

(Continued)

FOREIGN PATENT DOCUMENTS

| | | |
|---|---|---|
| CN | 103929790 A | 7/2014 |
| CN | 106921580 A | 7/2017 |

(Continued)

OTHER PUBLICATIONS

Office Action to the counterpart Korean Patent Application rendered by the Korean Intellectual Property Office (KIPO) on Apr. 14, 2022, 8 pages.

(Continued)

*Primary Examiner* — Shah M Rahman
(74) *Attorney, Agent, or Firm* — Skaar Ulbrich Macari, P.A.

(57) ABSTRACT

A method and apparatus are disclosed from the perspective of a first node supporting wireless access and wireless backhaul. In one embodiment, the method includes the first node transmitting a first message to a second node, for updating a second routing path maintained by the second node.

12 Claims, 21 Drawing Sheets

(56) References Cited

U.S. PATENT DOCUMENTS

| | | | |
|---|---|---|---|
| 10,320,652 B2 * | 6/2019 | Thubert | H04L 45/48 |
| 11,223,558 B2 * | 1/2022 | Bogdanski | H04L 49/253 |
| 2009/0276822 A1 * | 11/2009 | Yamane | H04N 7/17318 |
| | | | 725/118 |
| 2012/0202498 A1 * | 8/2012 | Sachs | H04W 28/16 |
| | | | 455/436 |
| 2017/0006499 A1 | 1/2017 | Hampel et al. | |
| 2019/0045569 A1 * | 2/2019 | Abedini | H04W 16/28 |
| 2019/0297555 A1 * | 9/2019 | Hampel | H04L 47/263 |
| 2020/0107342 A1 * | 4/2020 | Kuang | H04W 80/02 |
| 2021/0092667 A1 * | 3/2021 | Zhu | H04W 40/24 |
| 2021/0105795 A1 * | 4/2021 | Zhu | H04W 40/34 |
| 2021/0160861 A1 * | 5/2021 | You | H04W 56/0005 |
| 2021/0168022 A1 * | 6/2021 | Tochino | H04L 47/12 |
| 2021/0219183 A1 * | 7/2021 | Huang | H04W 28/0278 |
| 2021/0258244 A1 * | 8/2021 | Xu | H04L 45/28 |
| 2021/0282050 A1 * | 9/2021 | Adjakple | H04L 1/0002 |
| 2022/0006719 A1 * | 1/2022 | Barry | H04L 41/12 |

FOREIGN PATENT DOCUMENTS

| | | | | |
|---|---|---|---|---|
| CN | 110461019 A | * | 11/2019 | H04W 40/12 |
| WO | WO-2019192605 A1 | * | 10/2019 | H04L 41/12 |

OTHER PUBLICATIONS

ZTE, R3-182795, Consideration on Routing Design for IAB, 3GPP TSG RAN WG3 #100, 3GPP server release date (May 11, 2018), 4 pages.

Office Action to the counterpart Chinese Patent Application rendered on May 8, 2021, 8 pages.

* cited by examiner

METHOD AND APPARATUS OF UPDATING ROUTING TABLE OF AN IAB (INTEGRATED ACCESS BACKHAUL) NODE IN A WIRELESS COMMUNICATION SYSTEM

CROSS-REFERENCE TO RELATED APPLICATIONS

The present Application is a continuation of U.S. patent application Ser. No. 16/502,992, filed Jul. 3, 2019, which claims priority to and the benefit of U.S. Provisional Patent Application Ser. No. 62/712,577, filed Jul. 31, 2018; with the entire disclosure of each referenced application incorporated fully herein by reference.

FIELD

This disclosure generally relates to wireless communication networks, and more particularly, to a method and apparatus of updating routing table of an IAB node in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first node supporting wireless access and wireless backhaul. In one embodiment, the method includes the first node transmitting a first message to a second node, for updating a second routing path maintained by the second node.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TR 38.913 V14.1.0, "Study on Scenarios and Requirements for Next Generation Access Technologies"; RP-172290, "Study on Integrated Access and Backhaul for NR"; and TR 38.874 V0.3.2, "Study on Integrated Access and Backhaul". The standards and documents listed above are hereby expressly incorporated by reference in their entirety.

Figure 1:
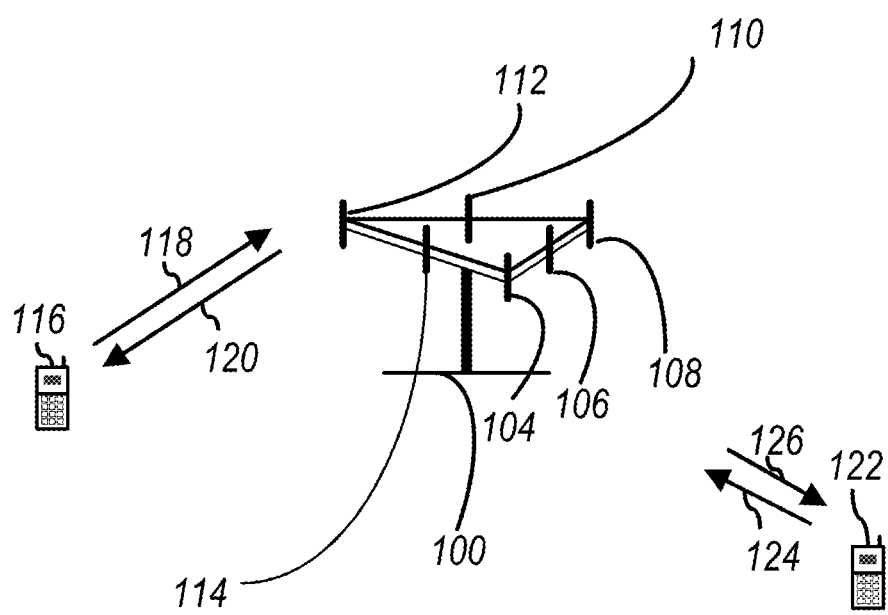
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a node, an access node, an IAB node, or some other terminology. An access terminal (AT) may also be called user equipment (UE), a wireless communication device, terminal, access terminal or some other terminology.

Figure 2:
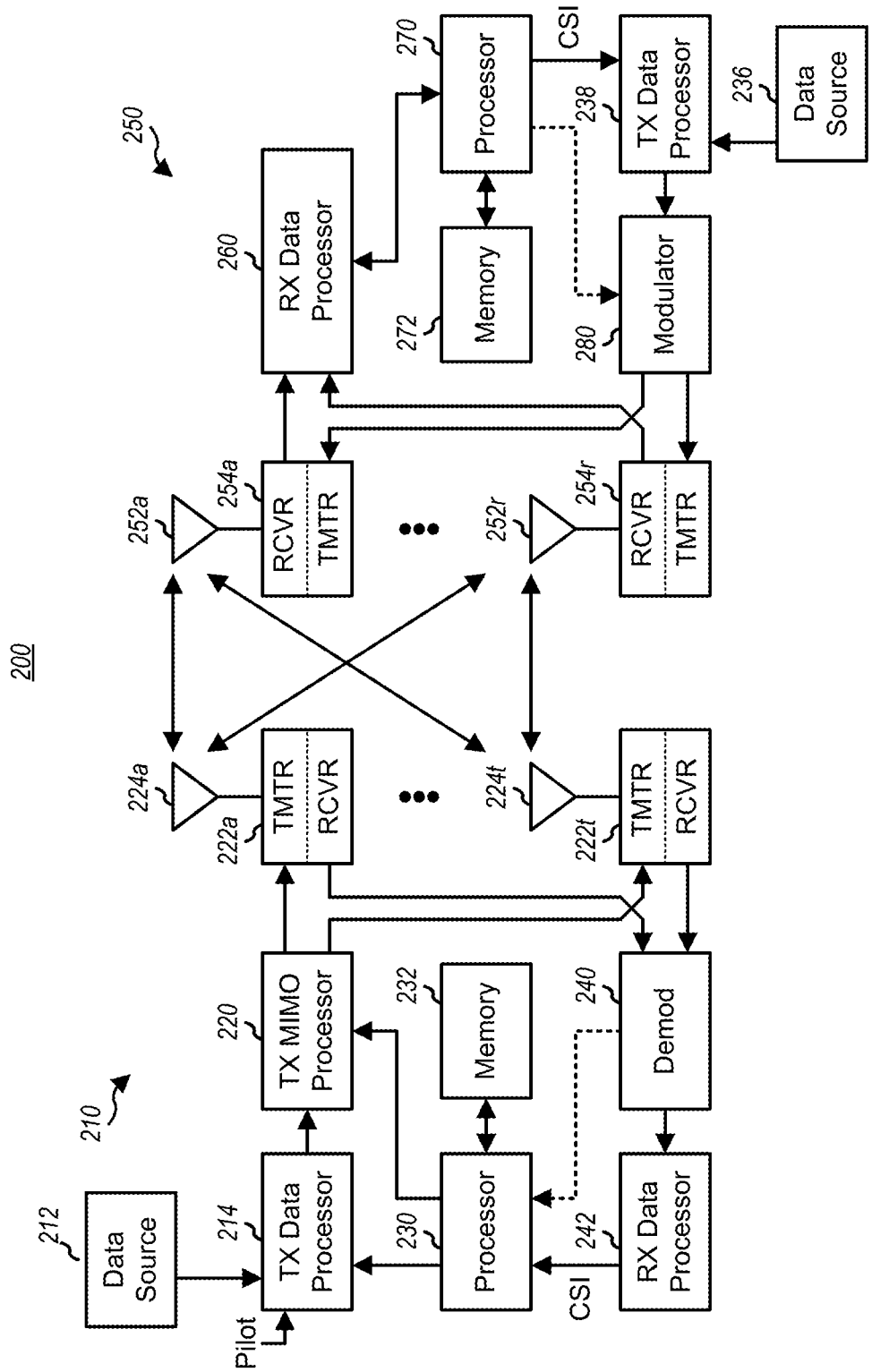
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
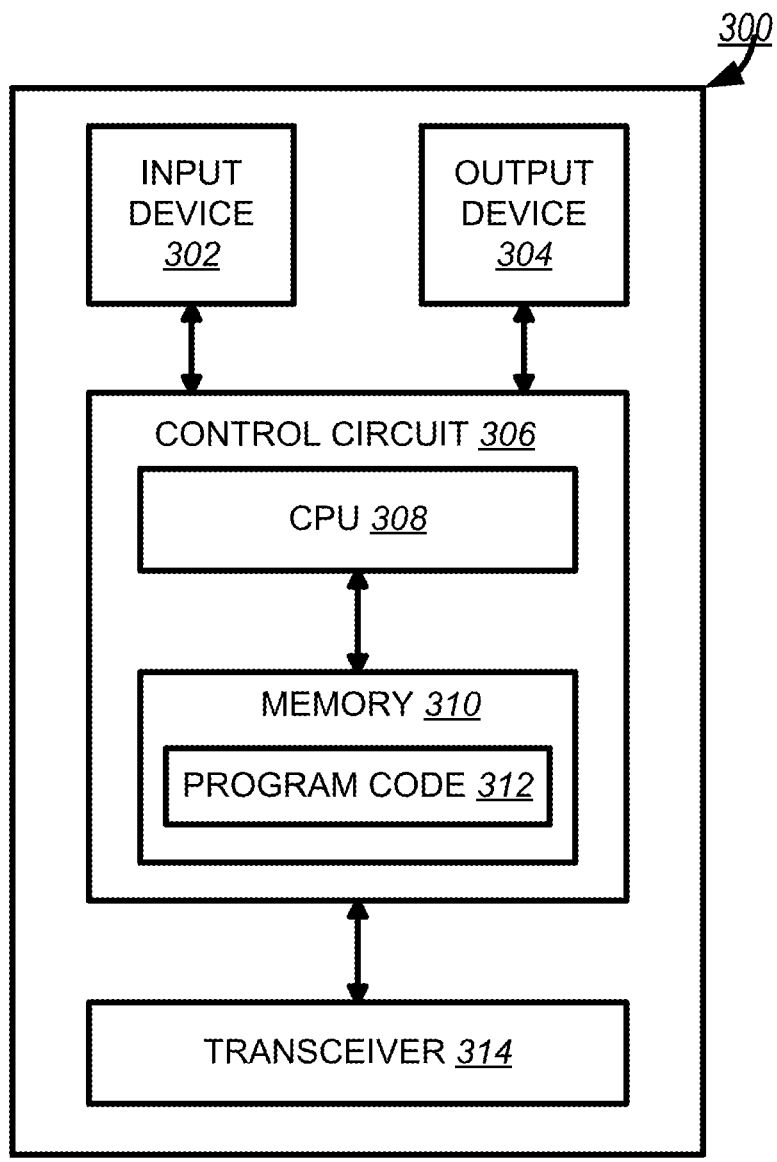
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
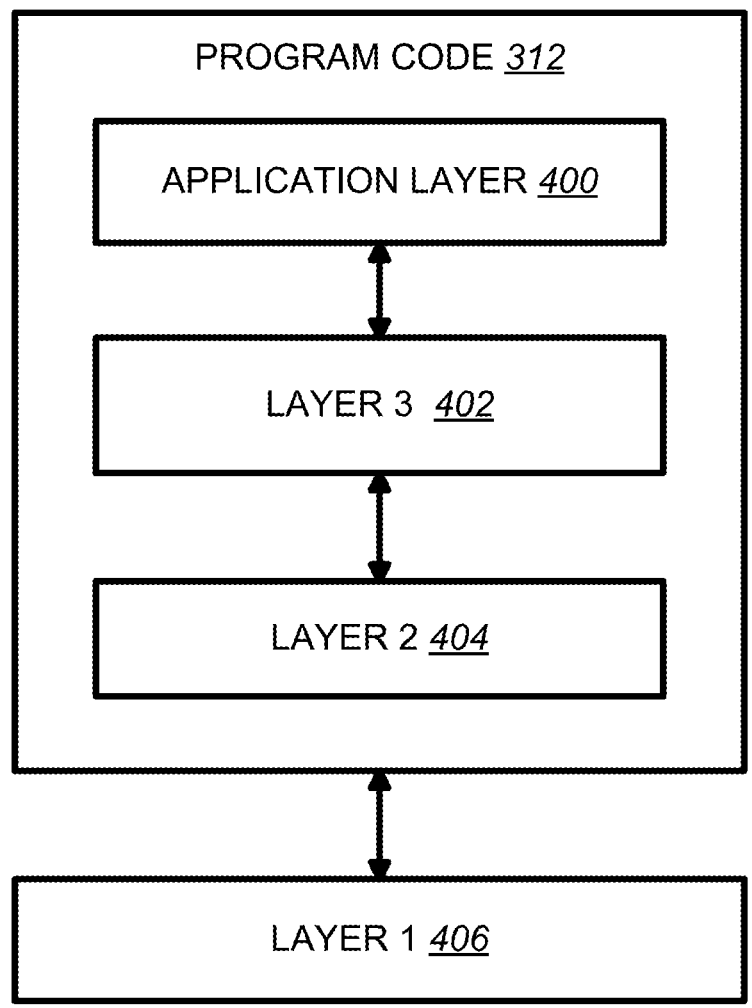
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Integrated Access and Backhaul (IAB) for NR is under study in 3GPP RP-172290. 3GPP RP-172290 provides the following description related to IAB:

3 Justification

One of the potential technologies targeted to enable future cellular network deployment scenarios and applications is the support for wireless backhaul and relay links enabling flexible and very dense deployment of NR cells without the need for densifying the transport network proportionately.

Due to the expected larger bandwidth available for NR compared to LTE (e.g. mmWave spectrum) along with the native deployment of massive MIMO or multi-beam systems in NR creates an opportunity to develop and deploy integrated access and backhaul links. This may allow easier deployment of a dense network of self-backhauled NR cells in a more integrated manner by building upon many of the control and data channels/procedures defined for providing access to UEs. An example illustration of a network with such integrated access and backhaul links is shown in FIG. 1, where relay nodes (rTRPs) can multiplex access and backhaul links in time, frequency, or space (e.g. beam-based operation).

Figure 5:
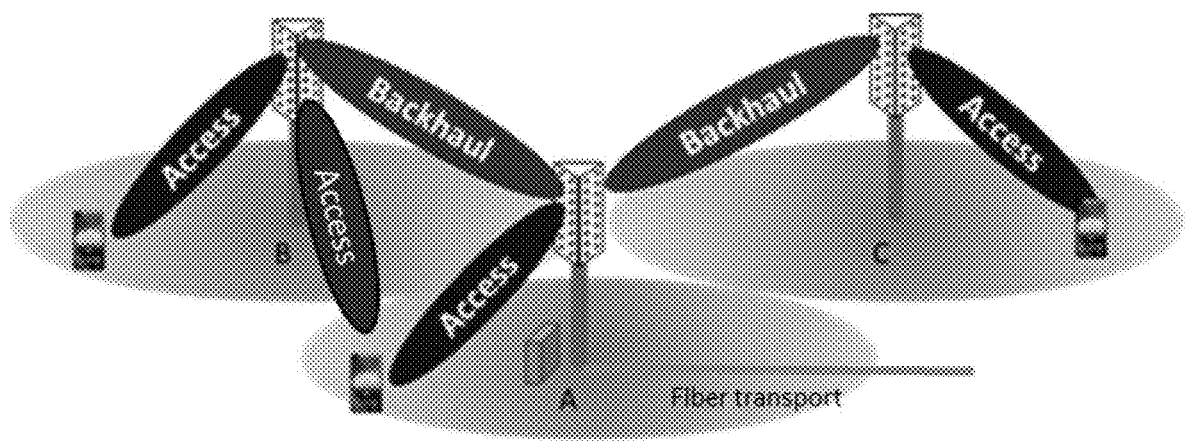
FIG. 5 is a reproduction of FIG. 1 of 3GPP RP-172290.

[FIG. 1 of 3GPP RP-172290, Entitled "Integrated Access and Backhaul Links", is Reproduced as FIG. 5]

The operation of the different links may be on the same or different frequencies (also termed 'in-band' and 'out-band' relays). While efficient support of out-band relays is important for some NR deployment scenarios, it is critically important to understand the requirements of in-band operation which imply tighter interworking with the access links operating on the same frequency to accommodate duplex constraints and avoid/mitigate interference.

In addition, operating NR systems in mmWave spectrum presents some unique challenges including experiencing severe short-term blocking that may not be readily mitigated by present RRC-based handover mechanisms due to the larger time-scales required for completion of the procedures compared to short-term blocking. Overcoming short-term blocking in mmWave systems may require fast RAN-based mechanisms for switching between rTRPs, which do not necessarily require involvement of the core network. The above described need to mitigate short-term blocking for NR operation in mmWave spectrum along with the desire for easier deployment of self-backhauled NR cells creates a need for the development of an integrated framework that allows fast switching of access and backhaul links. Over-the-air (OTA) coordination between rTRPs can also be considered to mitigate interference and support end-to-end route selection and optimization.

SA1 has already established service requirements for wireless self-backhauling (TS 22.261, Service requirement for the 5G System, section 6.12.2). These requirements are:

The 5G network shall enable operators to support wireless self-backhaul using NR and E-UTRA.

The 5G network shall support flexible and efficient wireless self-backhaul for both indoor and outdoor scenarios.

The 5G network shall support flexible partitioning of radio resources between access and backhaul functions.

The 5G network shall support autonomous configuration of access and wireless self-backhaul functions.

The 5G network shall support multi-hop wireless self-backhauling.

NOTE 1: This is to enable flexible extension of range and coverage area.

The 5G network shall support autonomous adaptation on wireless self-backhaul network topologies to minimize service disruptions.

The 5G network shall support topologically redundant connectivity on the wireless self-backhaul.

NOTE 2: This is to enhance reliability and capacity and reduce latency.

4 Objective 4.1 Objective of SI or Core Part WI or Testing Part WI

The objective of the study is to identify and evaluate potential solutions for the following requirements and aspects associated with the efficient operation of integrated access and wireless backhaul for NR. Frequency ranges up to 100 GHz will be considered.

Detailed objectives of the study item are:

Topology management for single-hop/multi-hop and redundant connectivity [RAN2, RAN3], e.g.

Protocol stack and network architecture design (including interfaces between rTRPs) considering operation of multiple relay hops between the anchor node (e.g. connection to core) and UE Control and User plane procedures, cd in handling f QoS, for supporting forwarding of traffic across one or multiple wireless backhaul links Route selection and optimization [RAN2, RAN1, RAN3], e.g.

Mechanisms for discovery and management of backhaul links for TRPs with integrated backhaul and access functionalities RAN-based mechanisms to support dynamic route selection (potentially without core network involvement) to accommodate short-term blocking and transmission of latency-sensitive traffic across backhaul links Evaluate the benefit of resource allocation/route management coordination across multiple nodes, for end-to-end route selection and optimization.

Dynamic resource allocation between the backhaul and access links [RAN1, RAN2], e.g., Mechanisms to efficiently multiplex access and backhaul links (for both DL and UL directions) in time, frequency, or space under a per-link half-duplex constraint across one or multiple backhaul link hops for both TDD and FDD operation Cross-link interference (CLI) measurement, coordination and mitigation between rTRPs and UEs High spectral efficiency while also supporting reliable transmission [RAN1]

Identification of physical layer solutions or enhancements to support wireless backhaul links with high spectral efficiency Note: support of these functionalities should consider existing mechanisms for access links as a starting point 3GPP TR 38.874 provides the following description related to IAB:

6 Architectures

Editor's note: This section is to describe architecture options identified for supporting IAB.

Figure 6:
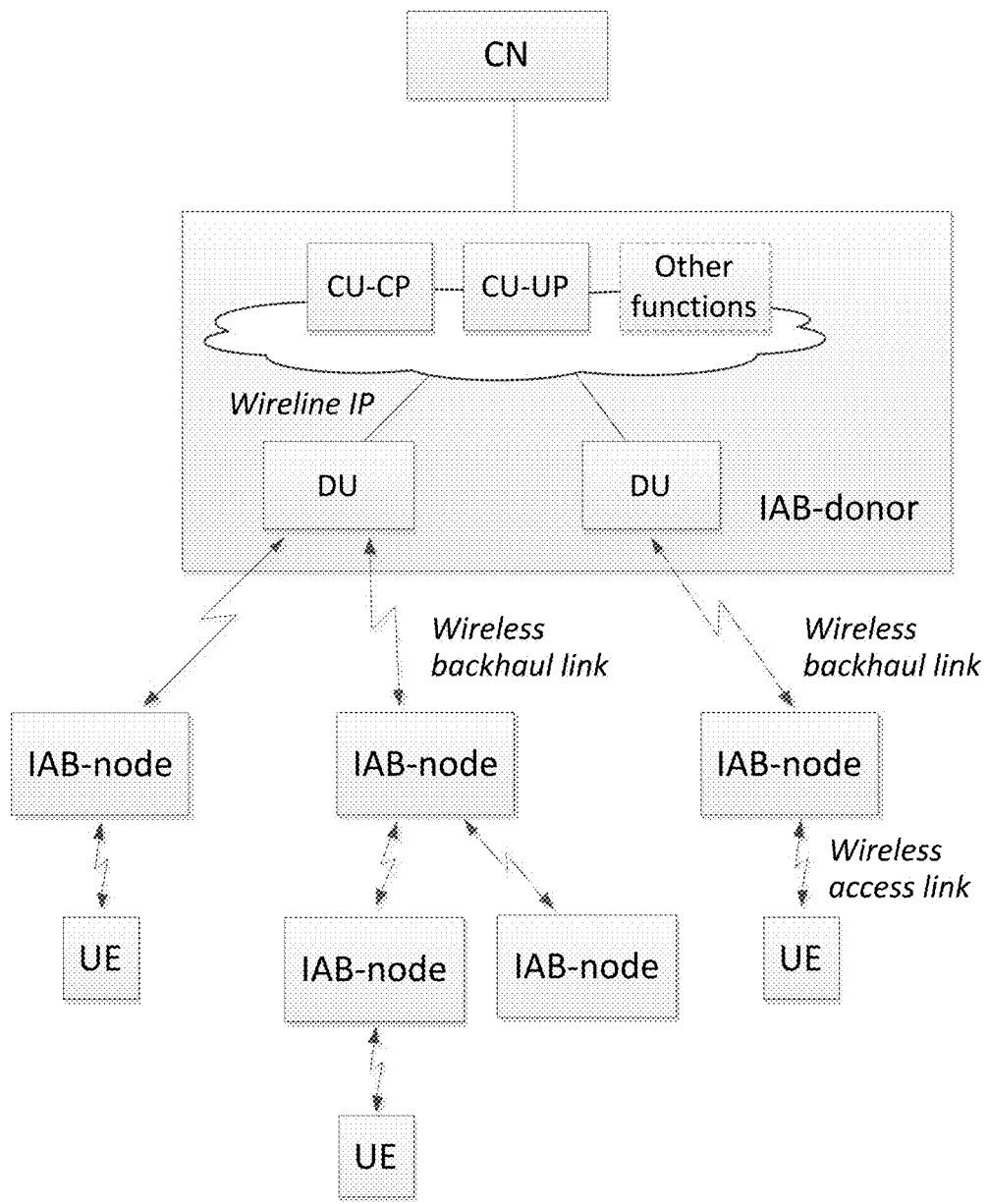
FIG. 6 is a reproduction of FIG. 6.1.1-1 of 3GPP TR 38.874 V0.3.2.

6.1 General
6.1.1 Functions and Interfaces for IAB
[FIG. 6.1.1-1 of 3GPP TR 38.874 V0.3.2, Entitled "Reference Diagram for IAB-Architectures (SA Mode)", is Reproduced as FIG. 6]

IAB strives to reuse existing functions and interfaces defined for access. In particular, Mobile-Termination (MT), gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization. The Mobile-Termination (MT) function has been defined a component of the Mobile Equipment. In the context of this study, MT is referred to as a function residing on an IAB-node that terminates the radio interface layers of the backhaul Uu interface toward the IAB-donor or other IAB-nodes.

FIG. 6.1.1-1 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised, which will be explored at a later stage of the study. Also, some of the functions presently associated with the IAB-donor may eventually be moved outside of the donor in case it becomes evident that they do not perform IAB-specific tasks.

6.2.2 IAB Architectures Proposed

All IAB multi-hop designs submitted to RAN-3 #99 can be represented with five architecture reference diagrams ([2]-[11]). These reference diagrams differ with respect to the modification needed on interfaces or additional functionality needed, e.g. to accomplish multi-hop forwarding. These five architectures are divided into two architecture groups. The main features of these architectures can be summarized as follows:

Architecture group 1: Consists of architectures 1a and 1b. Both architectures leverage CU/DU split architecture.
    Architecture 1a:
        Backhauling of F1-U uses an adaptation layer or GTP-U combined with an adaptation layer.
        Hop-by-hop forwarding across intermediate nodes uses the adaptation layer for operation with NGC or PDN-connection-layer routing for operation with EPC.

Architecture 1b:
        Backhauling of F1-U on access node uses GTP-U/UDP/IP.
        Hob-by-hop forwarding across intermediate node uses the adaptation layer.

Architecture Group 2: Consists of Architectures 2a, 2b and 2c
    Architecture 2a:
        Backhauling of F1-U or NG-U on access node uses GTP-U/UDP/IP.
        Hop-by-hop forwarding across intermediate node uses PDU-session-layer routing.

Architecture 2b:
        Backhauling of F1-U or NG-U on access node uses GTP-U/UDP/IP.
        Hop-by-hop forwarding across intermediate node uses GTP-U/UDP/IP nested tunnelling.

Architecture 2c:
        Backhauling of F1-U or NG-U on access node uses GTP-U/UDP/IP.
        Hop-by-hop forwarding across intermediate node uses GTP-U/UDP/IP/PDCP nested tunnelling.

Figure 7:
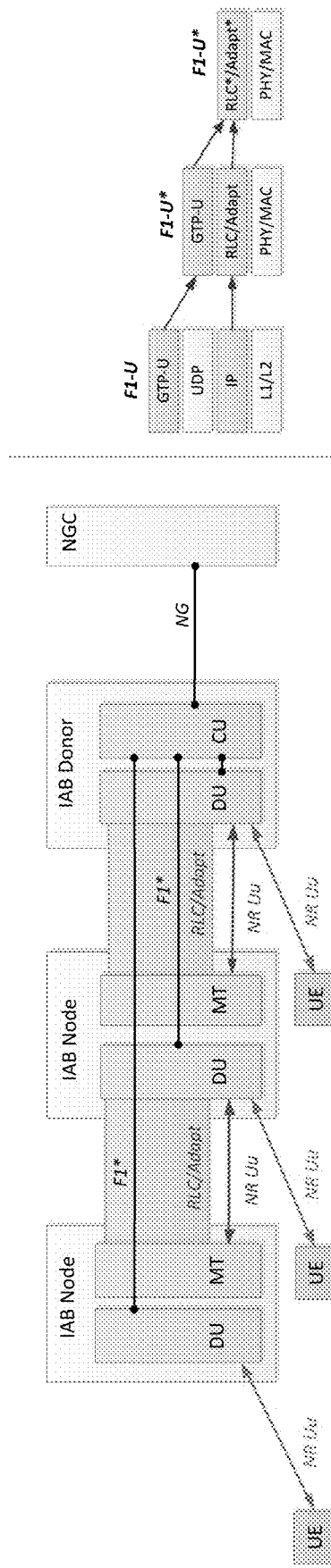
FIG. 7 is a reproduction of FIG. 6.3.1-1 of 3GPP TR 38.874 V0.3.2.

6.3 Architecture Group 1
6.3.1 Overview
6.3.1.1 Architecture 1a
[FIG. 6.3.1-1 of 3GPP TR 38.874 V0.3.2, Entitled "Reference Diagram for Architecture La (SA-Mode with NGC)", is Reproduced as FIG. 7]

Architecture 1a leverages CU/DU-split architecture. FIG. 6.3.1-1 shows the reference diagram for a two-hop chain of IAB-nodes underneath an IAB-donor, where IAB-node and UE connect in SA-mode to an NGC.

In this architecture, each IAB-node holds a DU and an MT. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*. Whether an IAB-node can connect to more than one upstream IAB-node or IAB-donor is FFS.

The donor also holds a DU to support UEs and MTs of downstream IAB-nodes. The IAB-donor holds a CU for the DUs of all IAB-nodes and for its own DU. It is FFS if different CUs can serve the DUs of the IAB-nodes. Each DU on an IAB-node connects to the CU in the IAB-donor using a modified form of F1, which is referred to as F1*. F1*-U runs over RLC channels on the wireless backhaul between the MT on the serving IAB-node and the DU on the donor. F1*-U transport between MT and DU on the serving IAB-node as well as between DU and CU on the donor is FFS. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ only on the end-to-end connection opposed to hop-by-hop. The right side of FIG. 6.3.1-1 shows two examples of such F1*-U protocol stacks. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM.

For NSA operation with EPC, the MT is dual-connected with the network using EN-DC. The IAB-node's MT sustains a PDN connection with the EPC, e.g., to provide the IAB-node with connectivity to the OAM.

Details of F1*, the adaptation layer and RLC* remain to be studied. Details of hop-by-hop forwarding are FFS. Transport of F1-AP is FFS. Protocol translation between F1* and F1 in case the IAB-donor is split is FFS.

Figure 8:
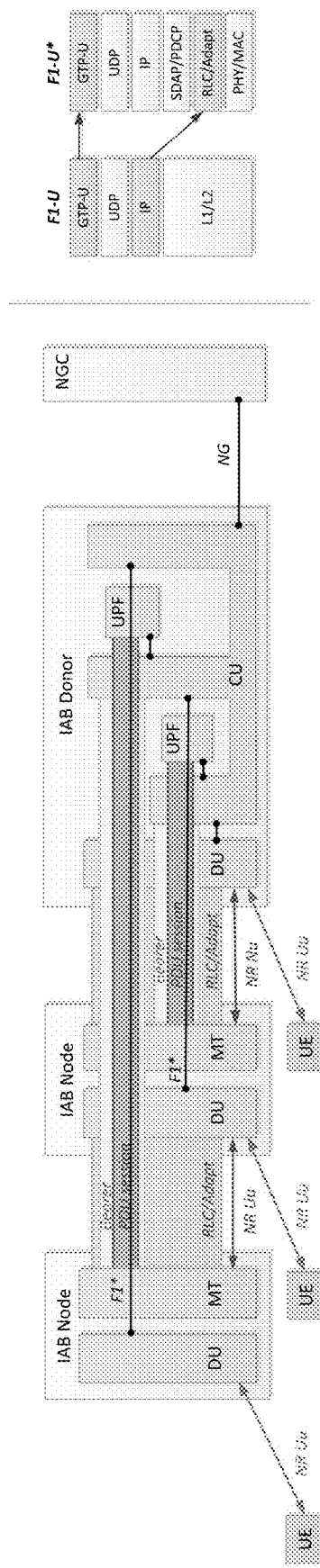
FIG. 8 is a reproduction of FIG. 6.3.1-2 of 3GPP TR 38.874 V0.3.2.

6.3.1.2 Architecture 1b
[FIG. 6.3.1-2 of 3GPP TR 38.874 V0.3.2, Entitled "Reference Diagram for Architecture 1b (SA-Mode with NGC)", is Reproduced as FIG. 8]

Architecture 1b also leverages CU/DU-split architecture. FIG. 6.3.1-2 shows the reference diagram for a two-hop chain of IAB-nodes underneath an IAB-donor. Note that the IAB-donor only holds one logical CU. Whether an IAB-node can connect to more than one upstream IAB-node or IAB-donor is FFS.

In this architecture, each IAB-node and the IAB-donor hold the same functions as in architecture 1a. Also, as in architecture 1a, every backhaul link establishes an RLC-channel, and an adaptation layer is inserted to enable hop-by-hop forwarding of F1*.

Opposed to architecture 1a, the MT on each IAB-node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via adaptation layer in the same manner as described for architecture 1a. The right side of FIG. 6.3.1-2 shows an example of the F1*-U protocol stack. For NSA operation with EPC, the MT is dual-connected with the network using EN-DC. In this case, the IAB-node's MT sustains a PDN connection with a L-GW residing on the donor.

[ . . . ]

9 Backhaul Aspects

Editor's note: Primary responsible WG for this clause is RAN3.

9.1 Additional Interfaces

[ . . . ]

9.2 IAB Topologies

The following IAB topologies are considered in the study:
1. Spanning tree (ST)
2. Directed acyclic graph (DAG)

Figure 9:
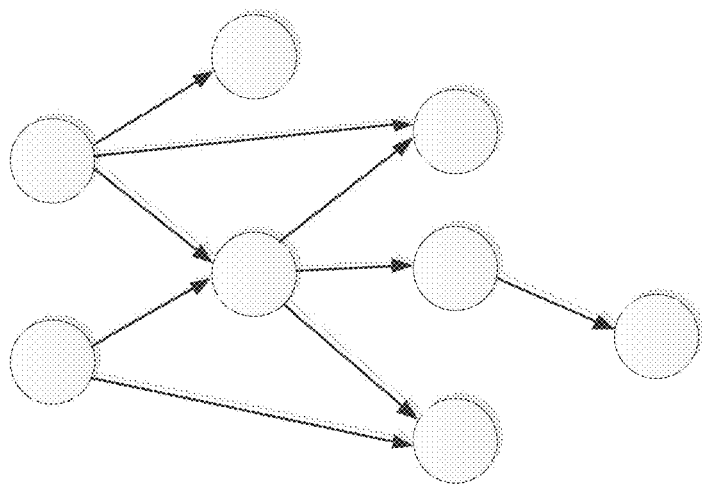
FIG. 9 is a reproduction of FIGS. 9.2-1 of 3GPP TR 38.874 V0.3.2.
Figure 9:
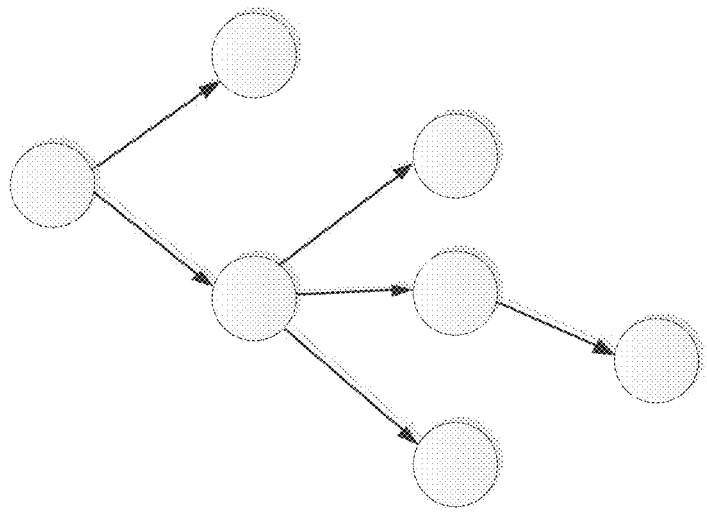

[FIGS. 9.2-1 of 3GPP TR 38.874 V0.3.2, Entitled "Examples for Spanning Tree and Directed Acyclic Graph. The Array Indicates the Directionality of the Graph Edge", is Reproduced as FIG. 9]

The directionality of the Uu-backhaul link, defined by uplink and downlink, is aligned with the hierarchy of the ST or DAG.

For ST, each IAB-node has only one parent node, which can be another IAB-node or the IAB-donor. Each IAB-node is therefore connected to only one IAB-donor at a time, and only one route exists between IAB-node and this IAB-donor.

Figure 10:
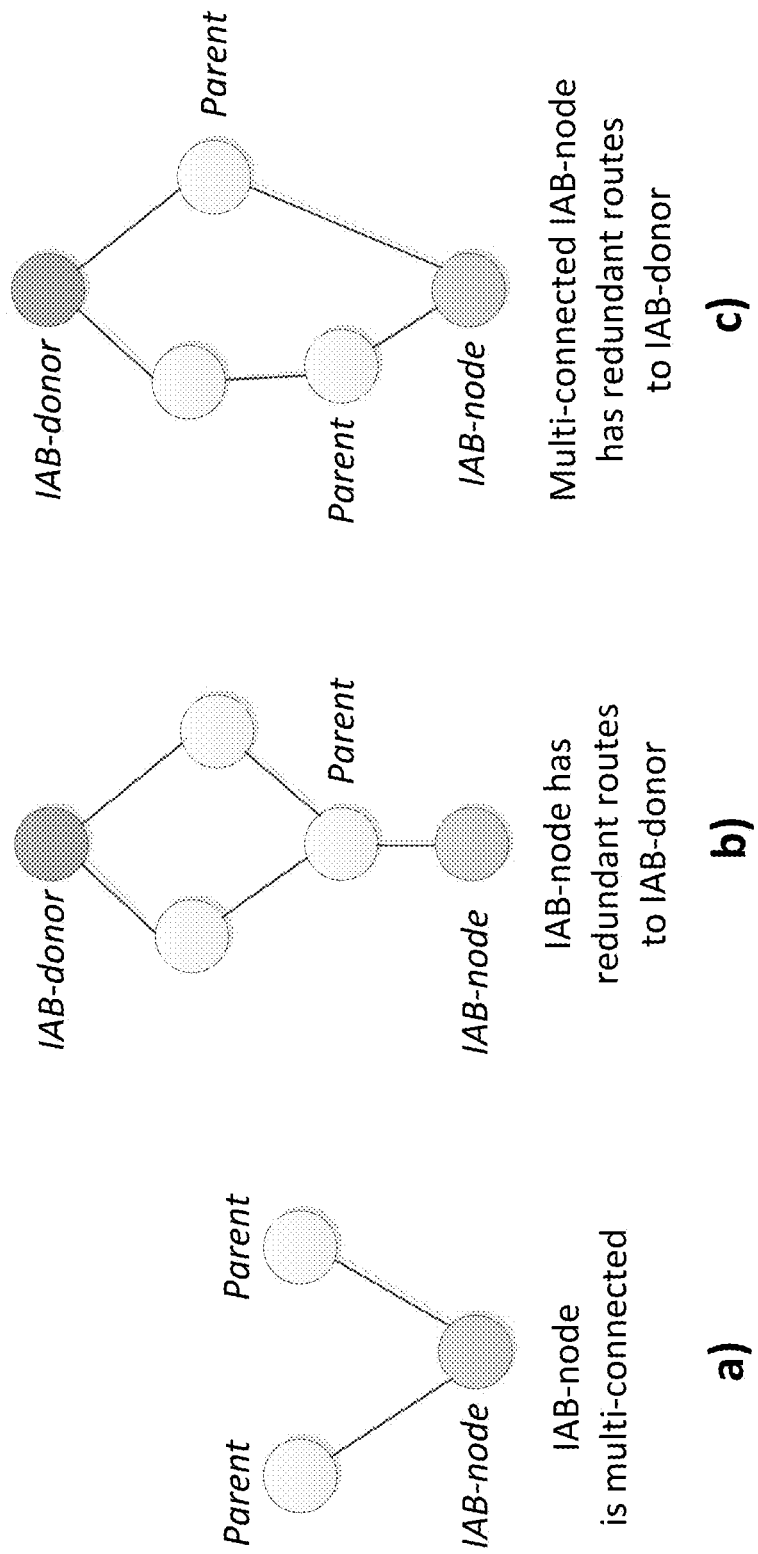
FIG. 10 is a reproduction of FIGS. 9.2-2 of 3GPP TR 38.874 V0.3.2.

[FIGS. 9.2-2 of 3GPP TR 38.874 V0.3.2, Entitled "Examples for Link- and Route Redundancy in DAG", is Reproduced as FIG. 10]

For DAG, the following options can be considered:

The IAB-node is multi-connected, i.e., it has links to multiple parent nodes (FIGS. 9.2-2a).

The IAB-node has multiple routes to another node, e.g. the IAB-donor (FIGS. 9.2-2b).

Both options can be combined, i.e., the IAB-node may have redundant routes to another node via multiple parents (FIGS. 9.2-2c).

Multi-connectivity or route redundancy may be used for back-up purposes. It is also possible that redundant routes are used concurrently, e.g., to achieve load balancing, reliability, etc.

Figure 11:
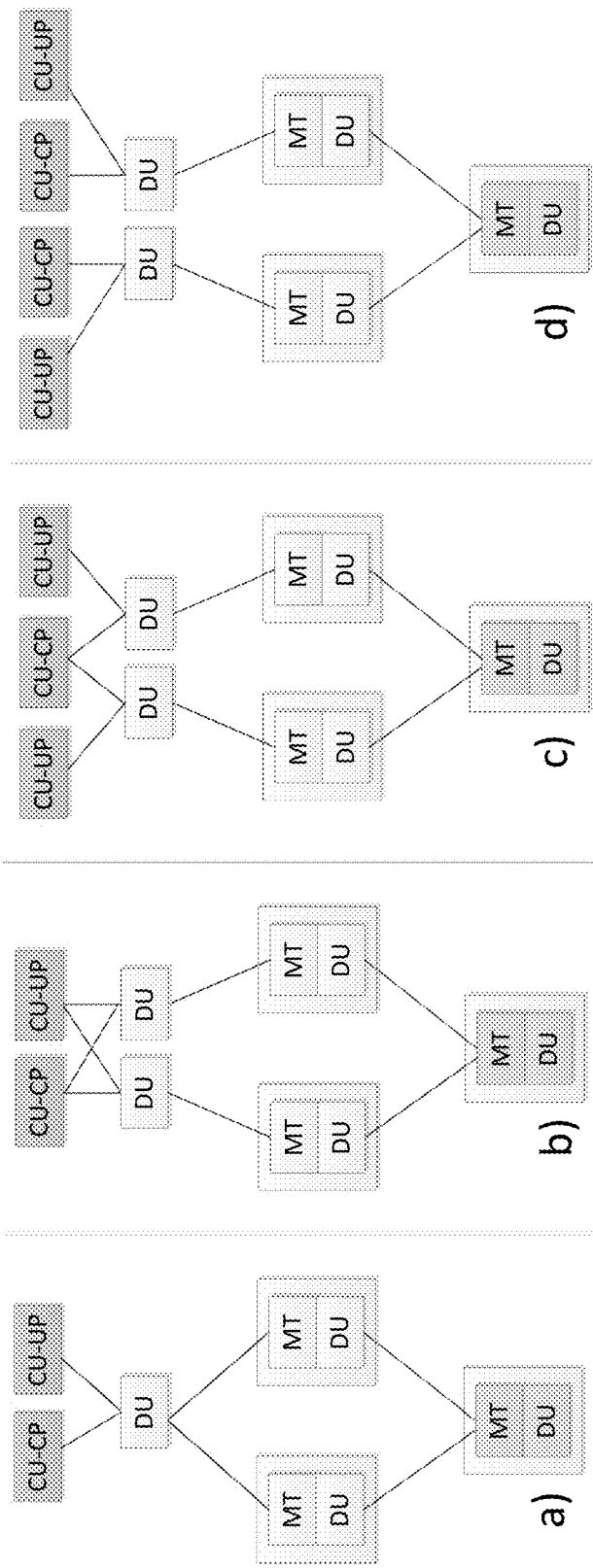
FIG. 11 is a reproduction of FIGS. 9.2-3 of 3GPP TR 38.874 V0.3.2.

[FIGS. 9.2-3 of 3GPP TR 38.874 V0.3.2, Entitled "Route Redundancy in Arch Group 1", is Reproduced as FIG. 11]

For architecture group 1, the following scenarios can be considered for an IAB-node with redundant routes (FIG. 3). These routes may pertain to:

The same IAB-donor DU, and therefore the same IAB-donor CU-CP and CU-UP (FIGS. 9.2-3a), Different IAB-donor DUs, but same IAB-donor CU-CP and CU-UP (FIGS. 9.2-3b), Different IAB-donor DUs, different IAB-donor CU-UP, but same IAB-donor CU-CP (FIGS. 9.2-3c), Different IAB-donor DUs, CU-CP and CU-UP (FIGS. 9.2-3d).

Figure 12:
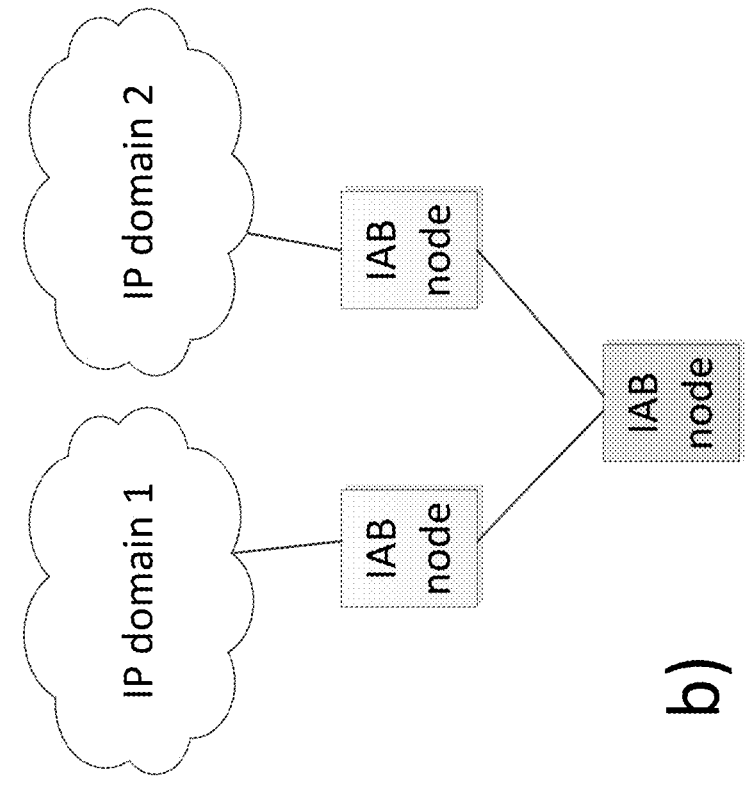
FIG. 12 is a reproduction of FIGS. 9.2-4 of 3GPP TR 38.874 V0.3.2.
Figure 12:
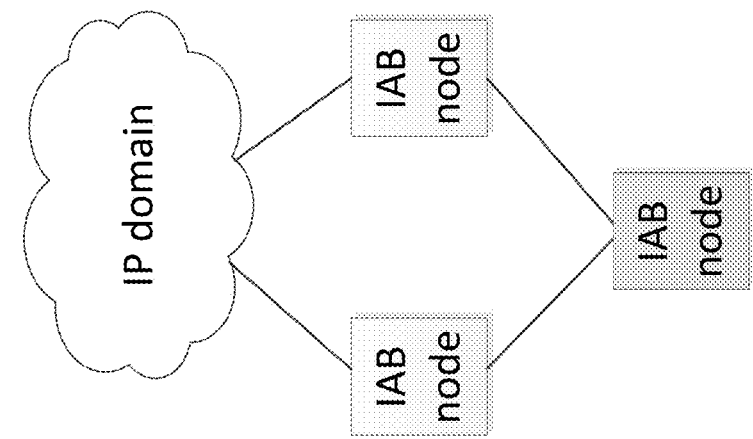

[FIGS. 9.2-4 of 3GPP TR 38.874 V0.3.2, Entitled "Examples for Link- and Route Redundancy in Arch Group 2", is Reproduced as FIG. 12]

For architecture group 2, the following scenarios need to be considered for an IAB-node with redundant routes. These routes may pertain to:

The same IP domain (FFS),

Different IP domains (FFS).

For at least some of these topologies, aspects of IP address management as well as procedures for topology adaptation will be studied. Further prioritization of these topologies may be necessary.

9.3 Integration of IAB-Node

IAB-node integration has the following phases:
1. The IAB-node authenticates with the operator's network and establishes IP connectivity to reach OAM functionality for OAM configuration.

This phase includes discovery and selection of a serving node, which can be an IAB-donor or another IAB-node. The IAB-node may retrieve this information, e.g. from OAM or via RAN signaling such as OSI or RRC.

This phase further includes setting up connectivity to other RAN nodes and CN.

This phase involves the MT function on the IAB-node.
2. The IAB-node's DU, gNB, or UPF are set up together with all interfaces to other RAN-nodes and CN. This phase must be performed before the IAB node can start serving UEs or before further IAB-nodes can connect.

For architectures 1a and 1b, this phase involves setup of the IAB-node's DU and the F1-establishment to the IAB-donor's CU-CP and CU-UP.

For architecture 2a, this phase involves setup of the IAB-node's gNB and UPF as well as integration into the PDU-session forwarding layer across the wireless backhaul.

This phase includes the IAB-node's integration into topology and route management.
3. The IAB-node provides service to UEs or to other integrated IAB-nodes.

UEs will not be able to distinguish access to the IAB-node from access to gNBs.

9.4 Modifications to CU/DU Architecture 9.4.1 Modifications of IAB-Donor/IAB-Node DU and IAB-Donor CU for Architecture Group 1

The study assumes that Rel 15 F1-U is considered as the baseline between the IAB-donor DU and the IAB-donor CU. If this baseline does not meet the requirements of the SI, then the study will consider potential modifications to Rel 15 F1-U.

The study will further consider modifications to the IAB-node DU that are necessary to support F1*-U over the wireless NR backhaul.

[ . . . ]

In general, an IAB-node is a RAN (Radio Access Network) node that supports wireless access to UEs and wirelessly backhauls the access traffic. An IAB-donor is generally a RAN node which provides UE's interface to core network and wireless backhauling functionality to IAB-nodes. The IAB-node may also be referred to as a rTRP (relay TRP). The IAB-donor may also be referred to as anchor node.

A parent node of an IAB-node may be a node connected to the IAB-node and the (transmission) direction from the IAB-node to the parent node is uplink direction. A child node of an IAB-node may be a node connected to the IAB-node and the direction from the IAB-node to the child node is downlink direction. The IAB-node has a direct link to its parent node or child node. The IAB-node may be served by its parent node. The IAB-node may serve its child node. The IAB-node may be scheduled by its parent node. The IAB-node may schedule its child node.

Each IAB-node may include a NW (network) part and a MT (mobile termination) part. The NW part has at least part of the functionalities that a typical NW (e.g. a gNB DU) should have. The MT part has at least part of the functionalities that a typical UE (e.g. a mobile phone) should have.

An IAB-node generally acts as NW through its NW part when it interacts with its child node. The child node could be a UE. The child node could be another IAB-node. An IAB-node acts as UE through its MT part when it interacts with its parent node. The parent node could be another IAB-node. The parent node could be an IAB-donor. An IAB-node may be able to act as NW and UE at the same time. An IAB-node may act either as NW or as UE at a time (e.g. in time-division manner).

An IAB system could include at least one IAB-donor and at least one IAB-node. An IAB system may have at most one IAB-donor. An IAB system may include one IAB topology. The IAB topology may be spanning tree (ST) or directed acyclic graph (DAG). Nodes belonging to the same IAB topology are within the same IAB system. The directionality (e.g. uplink and downlink) is aligned with the hierarchy of the topology of the IAB system (details are in Section 9.2 of 3GPP TR 38.874). For example, the IAB-donor has the highest level. The direction from a higher-level node to a lower-level node is defined as downlink, and the direction from a lower-level node to a higher-level node is defined as uplink.

A sub-branch of an IAB system is a subset of the IAB system, wherein the sub-branch includes a root node (could also be referred to as head or head node) and at least one IAB-node connecting to the root node as the child node of the root node. The parent node of the head node is outside the sub-branch. In case the head node is the IAB-donor, the sub-branch is equivalent to the entire IAB system.

It may be assumed that when an IAB-node acts as UE, it acquires UL (Uplink) resources by transmitting a signaling to its parent node. The signaling could be a Scheduling Request (SR). The signaling could be transmitted on a UL control channel, e.g. PUCCH (Physical Uplink Control Channel). The UL control channel is a UL channel between the IAB-node and the parent node. The signaling could be a Radom Access (RA) Preamble. The RA Preamble could be transmitted on PRACH (Physical Random Access Channel). The PRACH is a UL channel between the IAB-node and the parent node. After receiving the signaling, the parent node may provide UL grant to the IAB-node transmitting the signaling. The IAB-node could then perform UL data transmission on PUSCH (Physical Uplink Shared Channel) based on the received UL grant. The UL grant could be a DCI (Downlink Control Information) received on a downlink control channel, e.g. PDCCH (Physical Downlink Control Channel). The PUSCH is a UL channel between the IAB-node and the parent node. The PDCCH is a DL (Downlink) channel between the IAB-node and the parent node. In this paragraph, the IAB-node acts as UE and the parent node acts as NW.

When a UE directly connects to an IAB-node, the IAB-node is referred to as an access node of the UE. The link between a UE and an IAB-node is referred to as access link. In one embodiment, there is another IAB-node between the access node and the IAB-donor, and the other IAB-node is referred to as an intermediate node of the UE. The access node may also be considered as an intermediate node. The link between one IAB-node and another IAB-node (or IAB-donor) is referred to as backhaul link. An IAB-node could have one or multiple child nodes. An IAB-node could have one or multiple parent nodes. There could be one or multiple routes between IAB-node and IAB-donor depending on topology. It is assumed that IAB-donor has the full knowledge of the topology.

Figure 13:
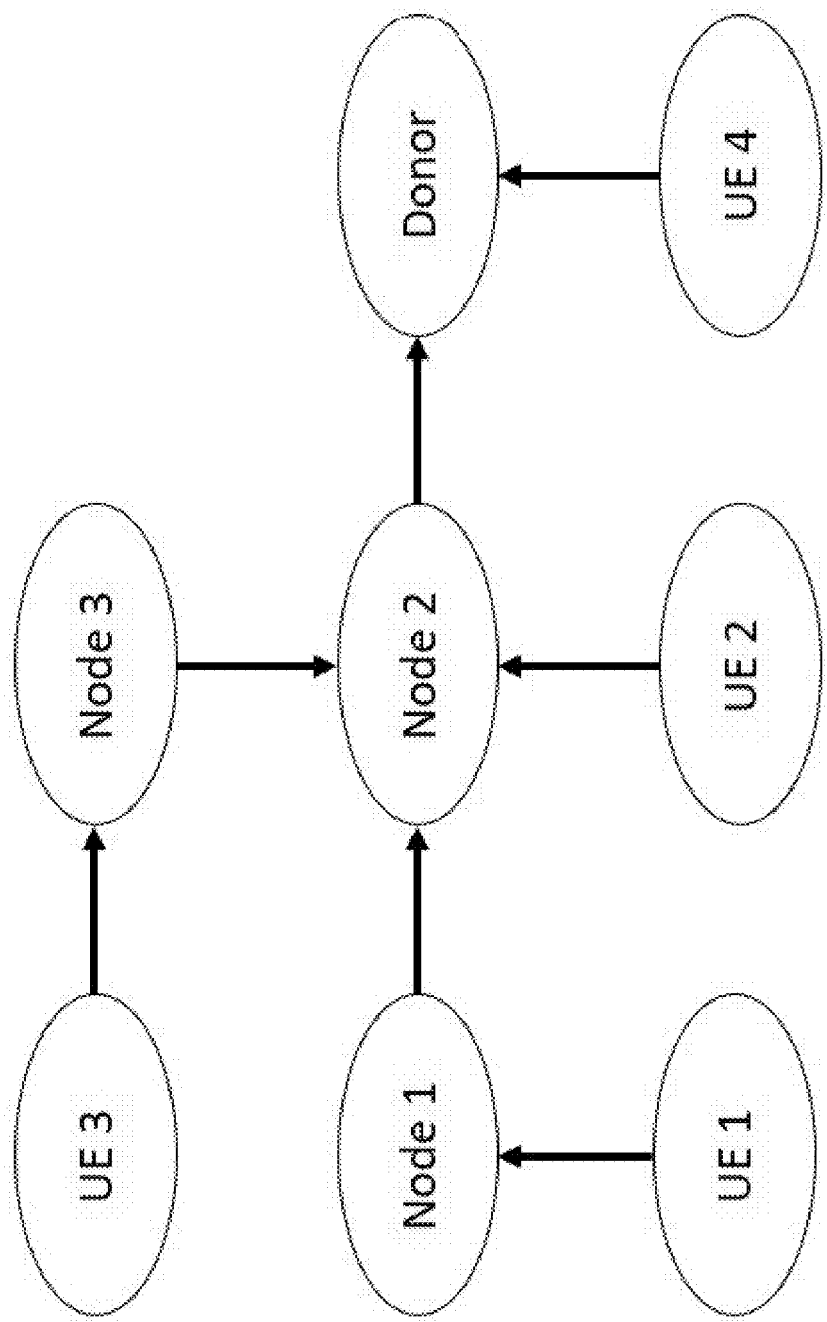
FIG. 13 is a diagram according to one exemplary embodiment.

There could be multi-hop in an IAB system. FIG. 13 is an example of a single IAB system, wherein four UEs target on the same IAB-donor, but with the same or different number of hops (i.e. number of intermediate nodes). In FIG. 13, the UE 1 and the UE 3 have the same number of hops. Multi-hop backhauling provides more range extension than single hop.

The backhaul link could be in-band or out-of-band with respect to the access link, depending on whether the backhaul link and the access link are at least partially overlapped in frequency or not. In-band backhauling creates half-duplexing or interference constraints, which imply that the IAB-node cannot transmit and receive simultaneously on both links.

An IAB-node could be physically fixed (i.e. its location is fixed) or mobile (e.g. on buses or trains). The relay of an IAB system could be L2-relay or L3-relay, depending on the architecture of the IAB system. The resource coordination between IAB-nodes could be distributed or centralized.

When DL data arrives at an IAB-node but the destination is not this IAB-node, the IAB-node may forward (relay) the DL data to its child node according to routing table configured for this IAB-node. The routing table is configured, for example, by IAB-donor based on topology of the IAB system. The routing table could be stored at this IAB-node.

Figure 14:
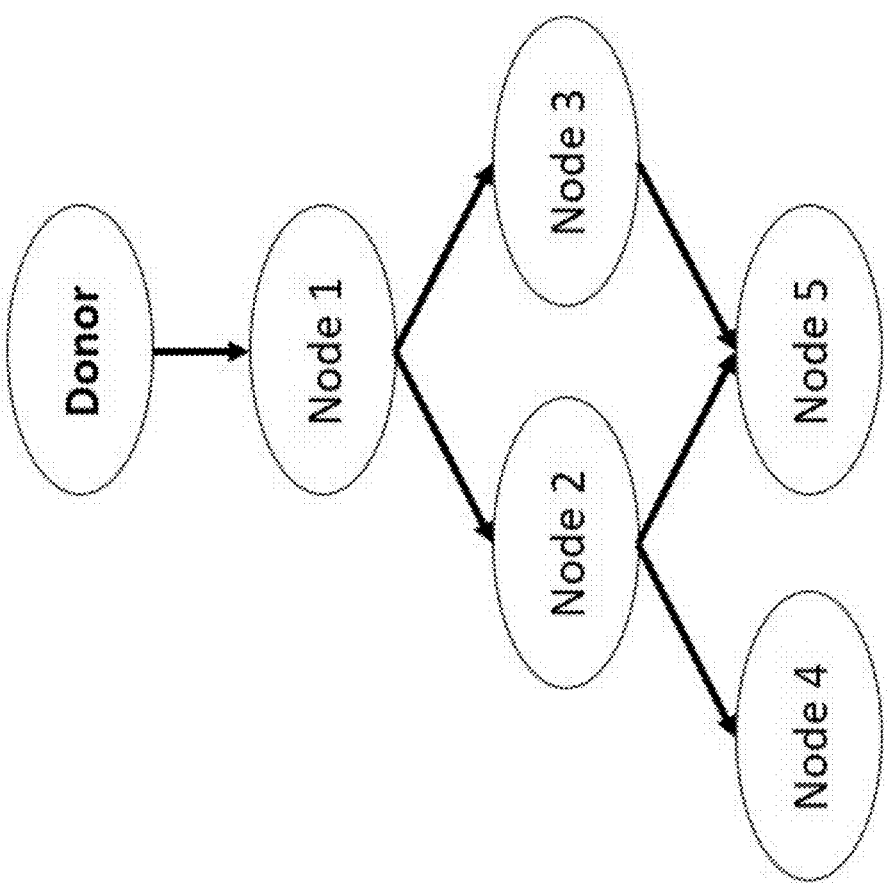
FIG. 14 is a diagram according to one exemplary embodiment.

FIG. 14 is an example of an IAB-system and routing tables for different nodes. In this example, there are two routes (i.e. through Node 2 and Node 3) between Node 5 and IAB-donor. When DL data for Node 5 arrive at Node 1, the Node 1 checks its routing table, and may forward the DL data to either Node 2 or Node 3 because both links are routable (i.e. DL data for Node 5 could be sent on either link). In case of UL data arrival, usually the destination is IAB-donor, and the IAB-node may just forward UL data to one of its parent nodes. A routing table for UL direction may thus be unnecessary. The route could also be referred to as routing or routing path.

The topology of an IAB system may be determined at the beginning of system setup. The topology and/or the routing of some or all IAB-nodes (may also include IAB-donor) in the IAB system may then be updated when an IAB-node is added to/removed from the IAB system, parent node change (e.g. link problem of serving parent node, load balancing, . . . ) or when the location of an existing IAB-node changes (e.g. a mobile IAB-node). The routing tables should also be updated when topology changes. For fixed-location IAB-nodes, the topology should be stable and is not updated frequently.

Figure 15:
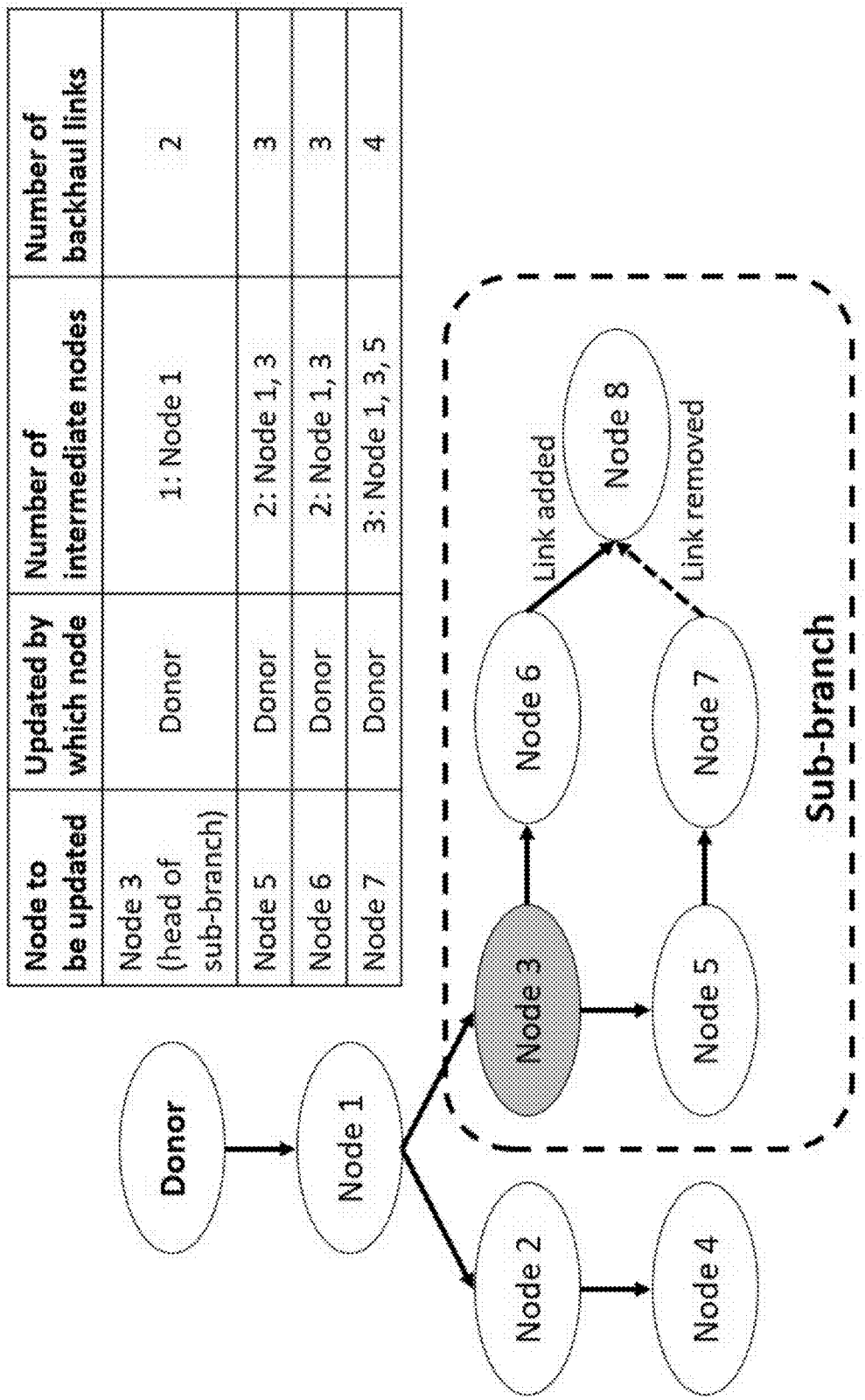
FIG. 15 is a diagram according to one exemplary embodiment.

Given that the IAB-donor should have full knowledge of topology information, the update of routing table for an IAB-node may be initiated by the IAB-donor. The IAB-donor may be responsible for updating the routing table of each node whose routing is affected. For example, if there are in total 5 IAB-nodes to be updated due to topology change, the IAB-donor will transmits in total 5 separated messages, wherein each message terminates at different target IAB-node for updating the target IAB-node. This update scheme could be referred to as end-to-end routing table update. Each message goes through the intermediate nodes (and backhaul links) between IAB-donor and the target IAB-node, and some intermediate nodes of different target IAB-node may be the same. One drawback of this end-to-end update is that if there are many IAB-nodes needing update, the signaling overhead on backhaul links becomes high. Intermediate nodes shared by many target IAB-nodes will also have high loading. FIG. 15 illustrates this issue.

As shown in FIG. 15, when parent node of Node 8 is changed from Node 7 to Node 6, routing tables for IAB-nodes including Node 3, Node 5, Node 6 and Node 7 need to be updated. If the routing table update is signaled by the IAB-donor, the signaling to update routing table of Node 3 is transmitted from Donor to Node 3 via Node 1. The signaling to update routing table of Node 5 is transmitted from Donor to Node 5 via Node 1 and Node 3. The signaling to update routing table of Node 6 is transmitted from Donor to Node 6 via Node 1 and Node 3. The signaling to update routing table of Node 7 is transmitted from Donor to Node 7 via Node 1, Node 3, and Node 5. In this example, Node 1 & Node 3, as well as the backhaul links between Donor and Node 3, have highest loading. In FIG. 15, the Donor could be an IAB-donor; nodes other than the Donor could be an IAB-node; and nodes other than the Donor could be a UE.

To reduce the overhead for routing table update, the update of routing table for an IAB-node may be initiated by another IAB-node. For example, a first IAB-node could indicate a second IAB-node to update a routing path maintained by the second IAB-node. The first IAB-node may not be an IAB-donor. The second IAB-node may not be an IAB-donor. The first IAB-node may transmit a message to the second IAB-node for updating a routing path. The first IAB-node may indicate the second IAB-node to update the routing path in response to receiving a message of routing path update from an IAB-donor of the first IAB-node. The first IAB-node may also indicate the second IAB-node to update the routing path in response to receiving a message of routing path update from a parent node of the first IAB-node. The first IAB-node may update a routing path maintained by the first IAB-node in response to receiving a message of routing path update from an IAB-donor. The first IAB-node may also update a routing path maintained by the first IAB-node in response to receiving a message of routing path update from a parent node of the first IAB-node. The first IAB-node may indicate the second IAB-node to update the routing path in response to detection of backhaul link failure (or backhaul link recovery).

The backhaul link failure (or backhaul link recovery) may occur in a descendant node of the first IAB-node. The second IAB-node may be a child node of the first IAB-node. The second IAB-node may also be a descendant node of the first IAB-node. The first IAB-node may transmit information about the routing path update to the IAB-donor. A descendant node may be a node wherein the direction toward the node is downlink direction and there is at least one intermediate node in between.

One way is to perform hop-by-hop update (instead of end-to-end update). For example, each IAB-node's routing table is updated by this node's parent node which has fewer hops compared to IAB-donor, and then this node continues updating its child node if needed. Another way is to perform local update which is not handled by IAB-donor. As another example, within a sub-branch of the JAB system, each node's routing table is updated by the head node of this sub-branch. A head node of a sub-branch could be the node with fewest hops to the IAB-donor. A head node of a sub-branch could also be the top-most node in the sub-branch whose parent node is outside the sub-branch.

Given the above two ways, some alternatives are described below, and the alternatives may be used jointly. In one alternative, IAB-donor initiates hop-by-hop routing table update on head node of a sub-branch. Based on the method of routing table update describe above and illustrated in FIG. 15, several separated routing table update messages going through the same backhaul link (e.g. the backhaul links between Donor and Node 3 in FIG. 15) results in high signaling overhead. To avoid this, the IAB-donor could firstly update the IAB-node which has fewest hops to the IAB-donor among the IAB-nodes required to be updated (e.g. Node 3 in FIG. 16, the head IAB-node of a sub-branch). The IAB-node then determines whether its child node needs update or not. If it determines that update is needed, the IAB-node transmits routing table update message to its child node. The child node then repeats the hop-by-hop update if needed.

Figure 16:
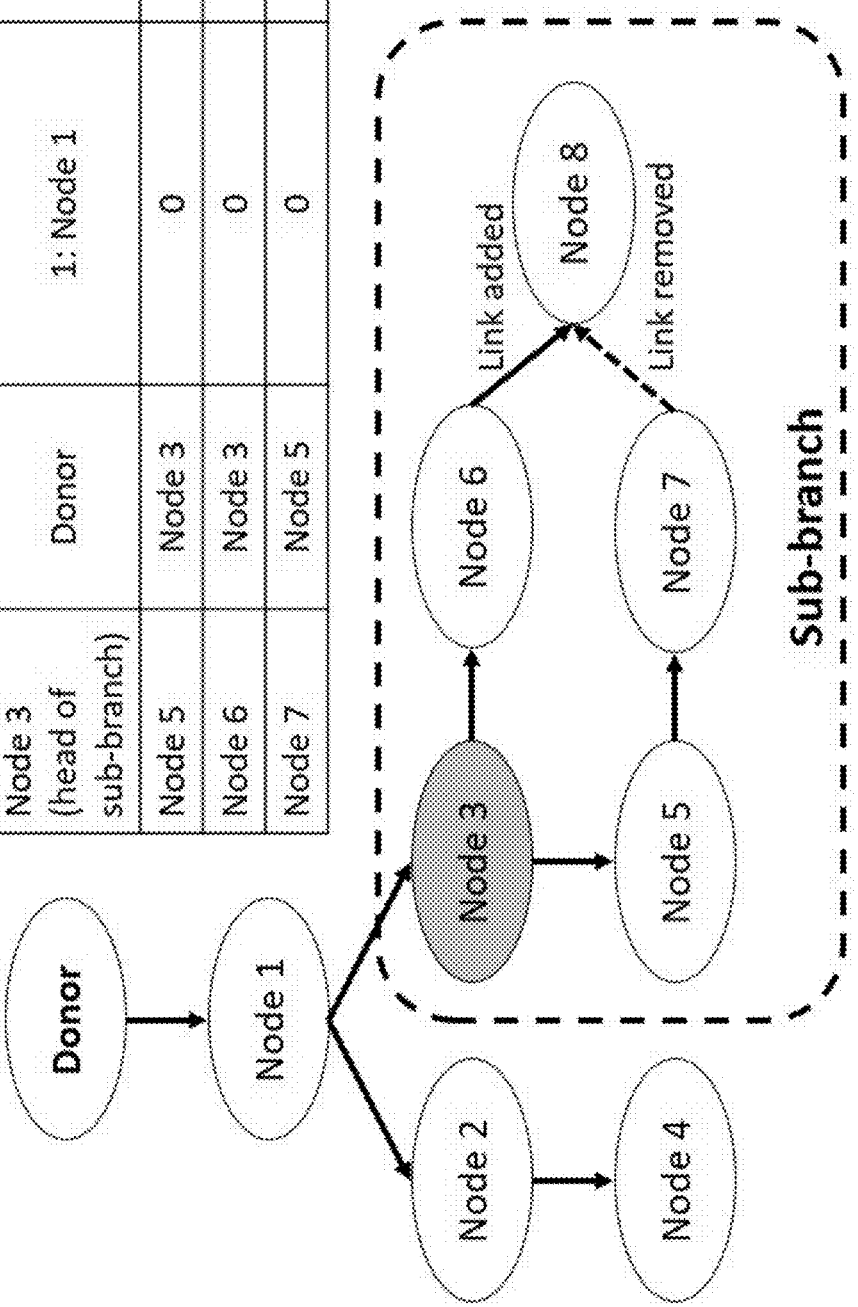
FIG. 16 is a diagram according to one exemplary embodiment.

An example of the hop-by-hop update initiated by IAB-donor is illustrated in FIG. 16. The Donor firstly transmits update message to Node 3 via Node 1. After being updated by Donor, Node 3 (determines to) transmits update message to Node 5 and Node 6. After it has been updated by Node 3, Node 5 (determines to) transmits update message to Node 7. In FIG. 16, the Donor could be an IAB-donor. Nodes other than the Donor could be an IAB-node or a UE.

The determination could be based on differences between old routing table and new routing table for this node, and then routing table update message for child node could be generated by this IAB-node. Alternatively, the routing table update message for nodes belonging to sub-branch of this IAB-node could also be carried in the update message for this IAB-node, and this IAB-node determines to forward update message to its child node if such message exists.

Since that there could be multiple routes between one IAB-node and another IAB-node, an IAB-node may receive the same routing table update message more than once. In this case, the same message could be regarded as duplicated message and the IAB-node could just discard the duplicated message.

In another alternative, IAB-donor initiates end-to-end routing table update on head node of a sub-branch. It is possible that topology change results in routing table update within one (small) sub-branch of the entire IAB system topology. The IAB-donor could firstly transmit update message to the head IAB-node (referred to as head or head node in the following) of the sub-branch. Then the head node of the sub-branch could transmit separated routing update message to each of the IAB-nodes under this head node.

Figure 17:
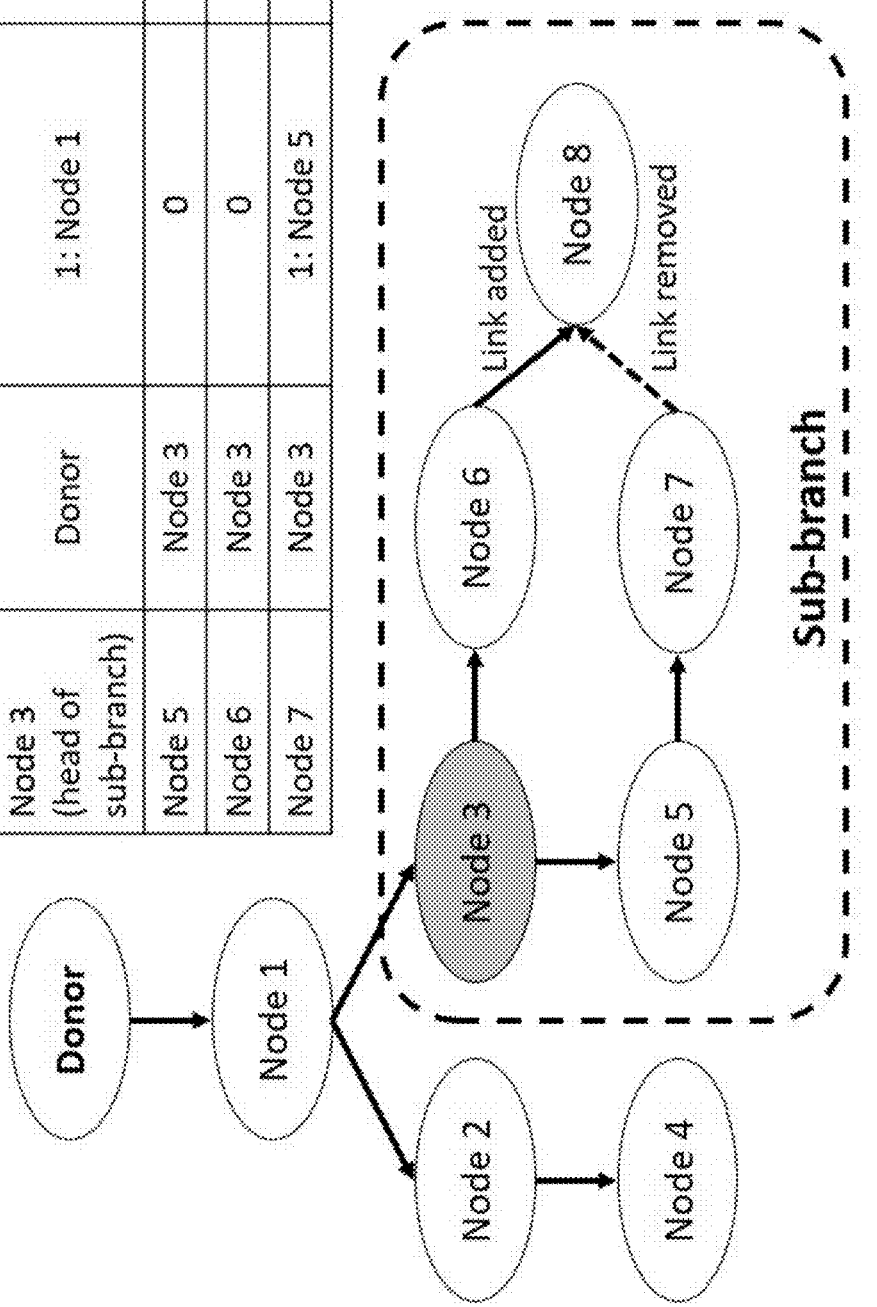
FIG. 17 is a diagram according to one exemplary embodiment.

An example is illustrated in FIG. 17. First, the Donor transmits update message to Node 3 (head node of a sub-branch) via Node 1. After being updated by Donor, Node 3 determines that Nodes 5, 6, and 7 also need to be updated. Node 3 transmits update message to Node 5. Node 3 transmits update message to Node 6. Node 3 transmits update message to Node 7 via Node 5. In FIG. 17, the Donor could be an IAB-donor. In FIG. 17, nodes other than the Donor could be an IAB-node or a UE.

The determination could be based on differences between old routing table and new routing table for this head node, and then routing table update message for nodes under this head node could be generated by this head node. Alternatively, the routing table update message for nodes belonging to sub-branch of this head node could also be carried in the update message for this head node, and this head node determines to forward update message to nodes under this head node if such message exists.

Since the update messages for nodes under the head node is transmitted by the head node itself, there should be no duplicated update messages as compared to alternative 1. In case IAB-donor is the head node of the sub-branch, this alternative reduced to pure end-to-end update.

In another alterative, at least some routing table update is initiated by the head node of a sub-branch directly instead of by the IAB-donor (i.e. local update). For example, if an IAB-node changes its parent node from one node to another node within a sub-branch, routing tables of IAB-nodes out-side this sub-branch do not need to be updated. The IAB-donor still forward DL data to the head node of this sub-branch, and then nodes (including head node) in the sub-branch will forward DL data according to the updated routing table. In this case, the head node could directly initiates routing table update using hop-by-hop or end-to-end as described above. For hop-by-hop, the head node first updates its routing table, and then updates its child node by generating and transmitting update message to its child. For end-to-end, the head node first updates its routing table, and then updates nodes under it by generating and transmitting separated update message to nodes under it.

Figure 18:
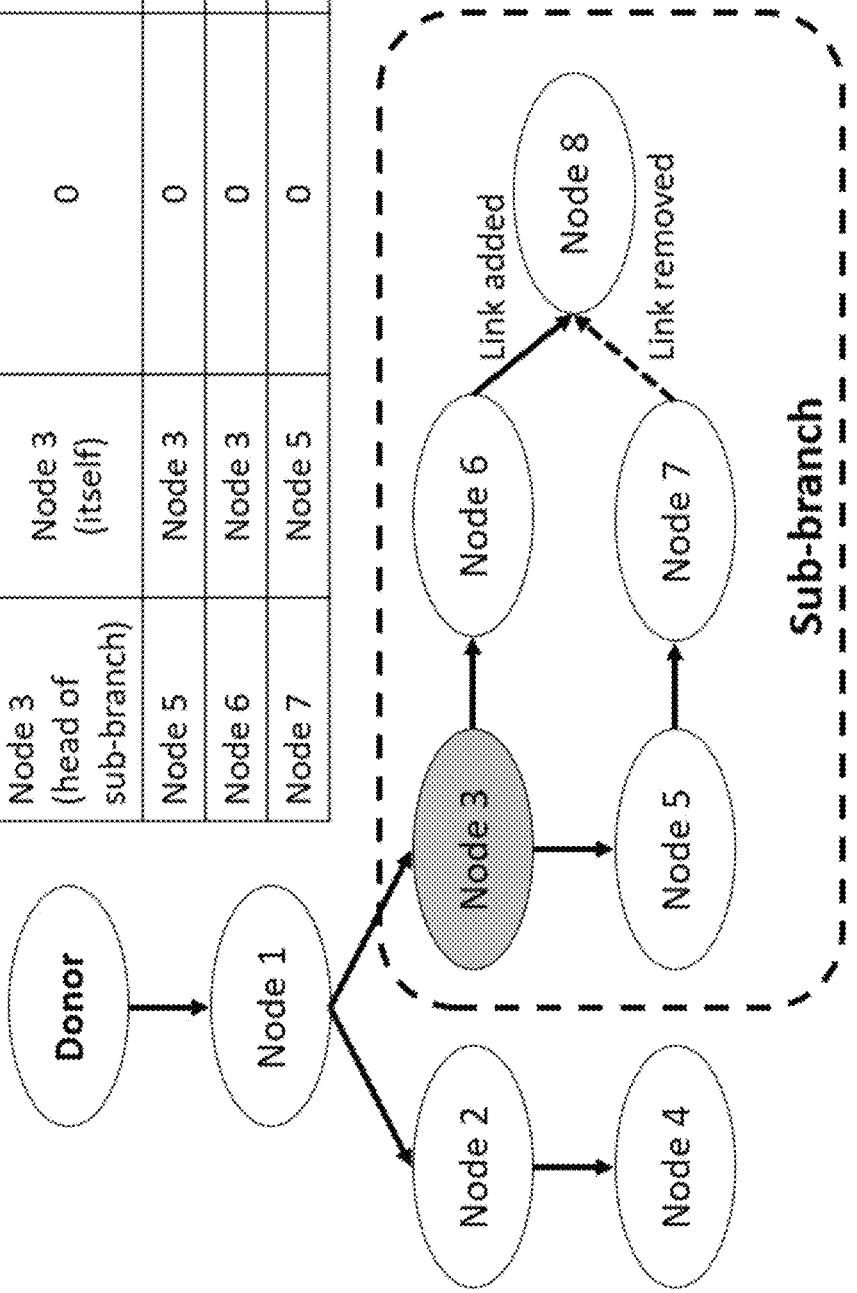
FIG. 18 is a diagram according to one exemplary embodiment.
Figure 19:
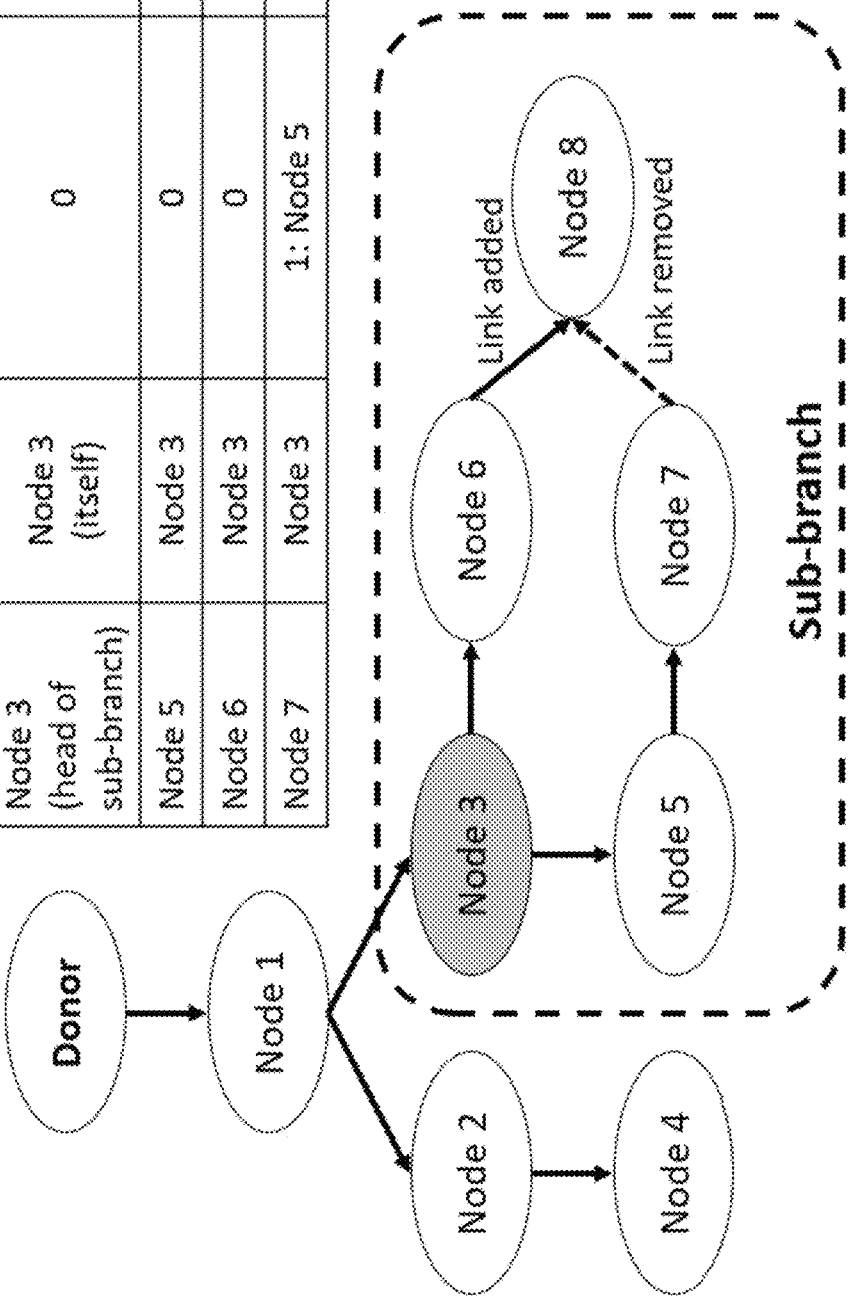
FIG. 19 is a diagram according to one exemplary embodiment.

FIG. 18 is an example of hop-by-hop update initiated by the head node of a sub-branch. Node 3 first updates its routing table. After being updated by itself, Node 3 (determines to) transmits update message to Nodes 5 and 6. After being updated by Node 3, Node 5 (determines to) transmits update message to Node 7. FIG. 19 is an example of end-to-end update initiated by the head node of a sub-branch. Node 3 firstly updates its routing table. After being updated by itself, Node 3 determines that Nodes 5, 6, and 7 also need to be updated. Node 3 transmits update message to Node 5. Node 3 transmits update message to Node 6. Node 3 transmits update message to Node 7 via Node 5. In FIG. 18, the Donor could be an IAB-donor. In FIG. 18, nodes other than the Donor could be an IAB-node or a UE. In FIG. 19, the Donor could be an IAB-donor. In FIG. 19, nodes other than the Donor could be an IAB-node or a UE.

Additionally, the head node could inform IAB-donor about the update. The head node could inform IAB-donor when the head node initiates the update. Additionally or alternatively, the head node could inform IAB-donor after completion of the update.

There may exist multiple routing paths for the same IAB-node. It is possible that one routing path is active at one time. An active routing path means that the IAB-node is allowed to use the routing path to transmit packets. It is also possible that more than one routing path are active at the same time. Multi-connectivity may be used to realize multiple active routing paths. For example, an IAB-node could be configured with multiple parent nodes. One of the parent node could be configured as PCell (or SpCell), and other parent nodes could be configured as SCells. A backhaul link may be activated or deactivated dynamically. The link between SCell parent and IAB-node could be activated or deactivated when SCell parent is activated/deactivated from the IAB-nodes perspective. Activation or deactivation of SCell parent node could thus affect whether the backhaul link is actually routable or not.

The update of routing table due to activation or deactivation could be achieved by normal routing table update procedure. Additionally or alternatively, the update of routing table due to activation or deactivation could be achieved by one or combination of the alternatives described above, such as hop-by-hop or end-to-end or being initiated by the IAB-donor or by a head node of a sub-branch. The PCell parent node and SCell parent node could belong to the same sub-branch.

The update of routing table due to activation or deactivation could be achieved by firstly constructing a complete routing table for a head node of a sub-branch, in which both PCell link and SCell link within the sub-branch are set to routable. Then, a mask or valid bit could be added to the routing table for the head node. Each entry of the mask or each valid bit could indicate whether the corresponding link is activated or deactivated. Additionally or alternatively, each entry of the mask or each valid bit could indicate whether the corresponding Node is activated or deactivated. Upon activation or deactivation of a link or a Node, the mask or the valid bit could be updated by the head node itself. Each node could maintain the mask or valid bit by itself.

Figure 20:
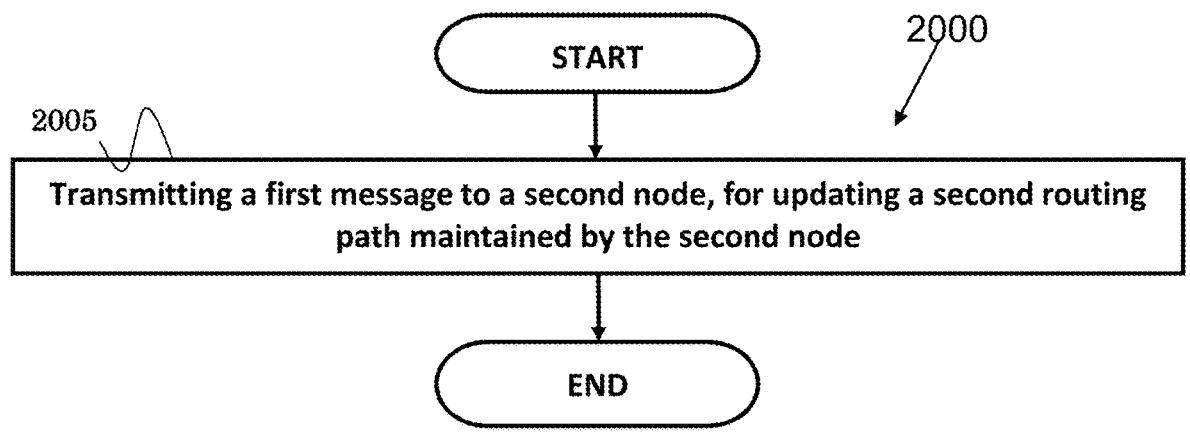
FIG. 20 is a flow chart according to one exemplary embodiment.

FIG. 20 is a flow chart 2000 according to one exemplary embodiment from the perspective of a first node. In step 2005, the first node transmits a first message to a second node, for updating a second routing path maintained by the second node. In one embodiment, the first node could transmit the first message in response to receiving a second message of routing path update from a third node. Additionally or alternatively, the first node could transmit the first message in response to detection of backhaul link failure (or recovery) of a descendant node.

In one embodiment, the first node could update a first routing path maintained by the first node in response to receiving the second message of routing path update from the third node. Additionally or alternatively, the first node could transmit information about the routing path update to an IAB (Integrated Access and Backhaul) donor of the first node.

In one embodiment, the second node could be a child node of the first node. The child node could be a node connected to the first node and the direction from the first node to the child node is downlink direction. The first node could serve the child node. Additionally or alternatively, the second node could be a descendant node of the first node. There could be at least one intermediate node between the first node and the descendant node and the direction from the first node to the descendant node is downlink direction.

In one embodiment, the third node could be a parent node of the first node. The parent node could be a node connected to the first node and the direction from the first node to the parent node is uplink direction. The first node could be served by the parent node. Additionally or alternatively, the third node could be an IAB donor of the first node. The IAB donor could be a RAN node which provides UE interface to core network and wireless backhauling functionality to IAB nodes.

In one embodiment, the first node and/or the second node may not be an IAB donor.

Referring back to FIGS. 3 and 4, in one exemplary embodiment of a first node, the communication device 300 includes a program code 312 stored in the memory 310. The CPU 308 could execute program code 312 to enable the first node to transmit a first message to a second node, for updating a second routing path maintained by the second node. Furthermore, the CPU 308 can execute the program code 312 to perform all of the above-described actions and steps or others described herein.

Figure 21:
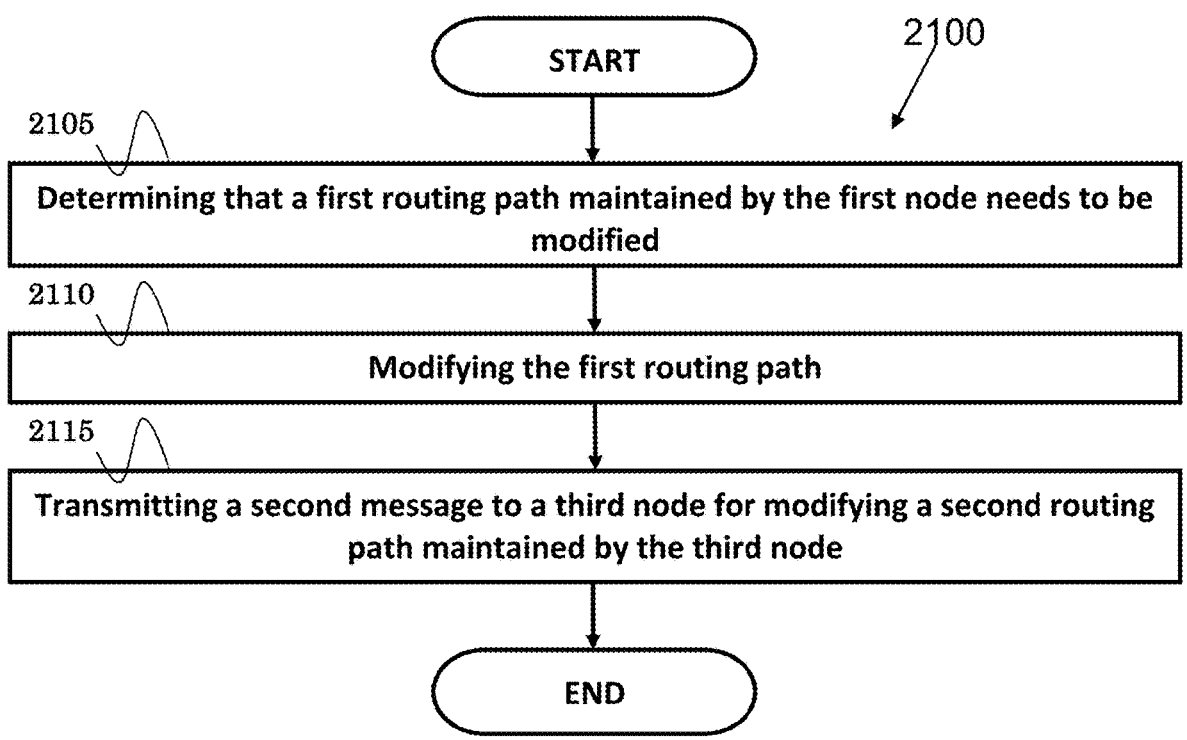
FIG. 21 is a flow chart according to one exemplary embodiment.

FIG. 21 is a flow chart 2100 according to one exemplary embodiment from the perspective of a first node. In step 2105, the first node determines that a first routing path maintained by the first node needs to be modified. In step 2110, the first node modifies the first routing path. In step 2115, the first node transmits a second message to a third node for modifying a second routing path maintained by the third node.

In one embodiment, the first node could determine that the first routing path needs to be modified by receiving a first message for modifying the first routing path from a second node. Additionally or alternatively, the first node could determine that the first routing path needs to be modified by receiving a first message for modifying the first routing path from a forth node.

In one embodiment, the first node could modify the first routing path in response to reception of the first message. Additionally or alternatively, the first node could modify the first routing path based on the first message.

In one embodiment, the first node could determine whether the third node needs to modify the second routing path in response to reception of the first message. The first node could also determine that the third node needs to modify the second routing path if the first message indicates that the third node needs to modify the second routing path. In addition, the first node could determine whether the third node needs to modify the second routing path in response to modification of the first routing path. Furthermore, the first node could determine that the third node needs to modify the second routing path based on differences between the first routing path before update and the first routing path after update.

In one embodiment, the first node could transmit the second message if the first node determines that the third node needs to modify the second routing path. Furthermore, the first node may not transmit the second message if the first node determines that the third node does not need to modify the second routing path. The first node could also transmit the second message after modifying the first routing path.

In one embodiment, the first node could inform a fourth node about the update of routing table. The first routing path could be a routing table stored in the first node. The modification of the first routing path could be addition, removal, and/or updating of the first routing path. The second message could be the same as the first message.

In one embodiment, the first node could be an IAB-node or an IAB-donor. Furthermore, the first node could be a child node of the second node. Alternatively, the first node may not be a child node of the second node, and may be below the second node from topology point of view.

In one embodiment, the first node could be a parent node of the third node. Alternatively, the first node may not be a parent node of the third node, and may be above the third node from topology point of view.

In one embodiment, the second node may be an IAB-node or an IAB-donor. Furthermore, the second node may be a parent node of the first node. Alternatively, the second node may not be a parent node of the first node, and may be above the first node from topology point of view.

In one embodiment, the third node may be an IAB-node. Furthermore, the third node may be a child node of the first node. Alternatively, the third node may not be a child node of the first node, and may be below the first node from topology point of view.

In one embodiment, the fourth node may not be the second node. Alternatively, the fourth node may be the second node. The fourth node could be an IAB-donor. Furthermore, the fourth node could be a child node of the first node. Alternatively, the fourth node may not be a child node of the first node and is below the first node from topology point of view.

In one embodiment, there may be a direct link between two nodes if one node is either a parent node or a child node of another node. Furthermore, there may be no direct link between two nodes if one node is neither a parent node nor a child node of another node.

Referring back to FIGS. 3 and 4, in one exemplary embodiment of a first node, the communication device 300 includes a program code 312 stored in the memory 310. The CPU 308 could execute program code 312 to enable the first node (i) to determine that a first routing path maintained by the first node needs to be modified, (ii) to modify the first routing path, and (iii) to transmit a second message to a third node for modifying a second routing path maintained by the third node. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for an Integrated Access and Backhaul (IAB) node supporting wireless access and wireless backhaul, comprising:
    receiving a first indication from a parent node, wherein the first indication is transmitted from the parent node due to a link problem of another parent node of the parent node;
    deactivating a backhaul link with the parent node in response to receiving the first indication from the parent node;
    transmitting a second indication to a child node in response to receiving the first indication from the parent node, wherein the second indication is for updating a routing path of the child node;
    receiving a third indication from the parent node, wherein the third indication is transmitted from the parent node due to recovery of the link problem;
    activating the backhaul link with the parent node in response to receiving the third indication from the parent node; and
    transmitting a fourth indication to the child node in response to receiving the third indication from the parent node, wherein the fourth indication is for updating the routing path of the child node.

2. The method of claim 1, wherein the second indication is to deactivate a backhaul link maintained by the child node.

3. The method of claim 1, wherein activating or deactivating the backhaul link means to allow or not allow the IAB node to use the backhaul link to transmit packets.

4. The method of claim 1, wherein the parent node is connected to the IAB node and direction from the IAB node to the parent node is uplink direction, or the IAB node is served by the parent node.

5. The method of claim 1, wherein the child node is connected to the IAB node and direction from the IAB node to the child node is downlink direction, or the IAB node serves the child node.

6. The method of claim 1, wherein the fourth indication is to deactivate a backhaul link maintained by the child node.

7. A communication device having an Integrated Access and Backhaul (IAB) node, comprising:
    a processor; and
    a memory operatively coupled to the processor, wherein the processor is configured to execute a program code to:
        receive a first indication from a parent node, wherein the first indication is transmitted from the parent node due to a link problem of another parent node of the parent node;
        deactivate a backhaul link with the parent node in response to receiving the first indication from the parent node;
        transmit a second indication to a child node in response to receiving the first indication from the parent node, wherein the second indication is for updating a routing path of the child node;
        receive a third indication from the parent node, wherein the third indication is transmitted from the parent node due to recovery of the link problem;
        activate the backhaul link with the parent node in response to receiving the third indication from the parent node; and
        transmit a fourth indication to the child node in response to receiving the third indication from the parent node, wherein the fourth indication is for updating the routing path of the child node.

8. The communication device of claim 7, wherein the second indication is to deactivate a backhaul link maintained by the child node.

9. The communication device of claim 7, wherein activating or deactivating the backhaul link means to allow or not allow the IAB node to use the backhaul link to transmit packets.

10. The communication device of claim 7, wherein the parent node is connected to the IAB node and direction from the IAB node to the parent node is uplink direction, or the IAB node is served by the parent node.

11. The communication device of claim 7, wherein the child node is connected to the IAB node and direction from the IAB node to the child node is downlink direction, or the IAB node serves the child node.

12. The communication device of claim 7, wherein the fourth indication is to deactivate a backhaul link maintained by the child node.

\* \* \* \* \*